United States Patent [19]

Demido et al.

[11] 4,060,283

[45] Nov. 29, 1977

[54] BRAKE ACTUATING PRESSURE PROPORTIONING SYSTEM AND PROPORTIONER MODIFYING ARM THEREFOR

[75] Inventors: Michael Demido, Troy; Ronald L. Shellhause, Vandalia, both of Ohio

[73] Assignee: General Motors Corporation, Detroit, Mich.

[21] Appl. No.: 740,794

[22] Filed: Nov. 11, 1976

[51] Int. Cl.$^2$ .................. B60T 8/18; B60T 8/26
[52] U.S. Cl. .................. 303/6 C; 188/195; 188/349; 303/22 R
[58] Field of Search ............... 303/22 A, 22 R, 23 R, 303/23 A, 6 C; 188/195, 349

[56] References Cited

U.S. PATENT DOCUMENTS

| 3,329,471 | 7/1967 | Oberthur | 303/22 R |
| 3,709,568 | 1/1973 | Miyake et al. | 303/22 R |
| 3,802,750 | 4/1974 | Kawai | 303/22 R |
| 3,837,713 | 9/1974 | Masuda et al. | 303/22 R |

Primary Examiner—Trygve M. Blix
Assistant Examiner—Douglas C. Butler
Attorney, Agent, or Firm—D. D. McGraw

[57] ABSTRACT

A brake pressure proportioner is mounted on a sprung portion of a vehicle and is attached to an unsprung portion by means of a modifying arm. The arm has ends pivoting on the unsprung portion and on a proportioner control arm so that the arm maintains a constant length during relative movements of the vehicle sprung and unsprung portions, modifying the action of the brake proportioner in accordance with such movements. The movements are proportional to vehicle load. The arm provides for compression or extension without affecting the proportioner when unsprung movements between gross vehicle curb weight (no load) and gross vehicle full weight (full load) positions are exceeded in either direction. The movement of the unsprung portion of the vehicle below the position for curb weight is known as rebound and above the curb weight position is known as jounce. The excess jounce travel beyond the gross vehicle full weight causes the arm to compress without further modifying the proportioner. The rebound travel of the vehicle unsprung portion permits the arm to extend without affecting the proportioner and also keeps the arm located in its proper relation with the vehicle sprung and unsprung portions. A modification uses a spring as the modifying arm. The proportioner is arranged so that the spring will extend upon jounce, will maintain its effective length when unsprung movements occur between the gross vehicle curb weight and the gross vehicle full weight positions, and will decrease its effective length when the unsprung movement exceeds the gross vehicle full weight position in the rebound direction.

5 Claims, 4 Drawing Figures

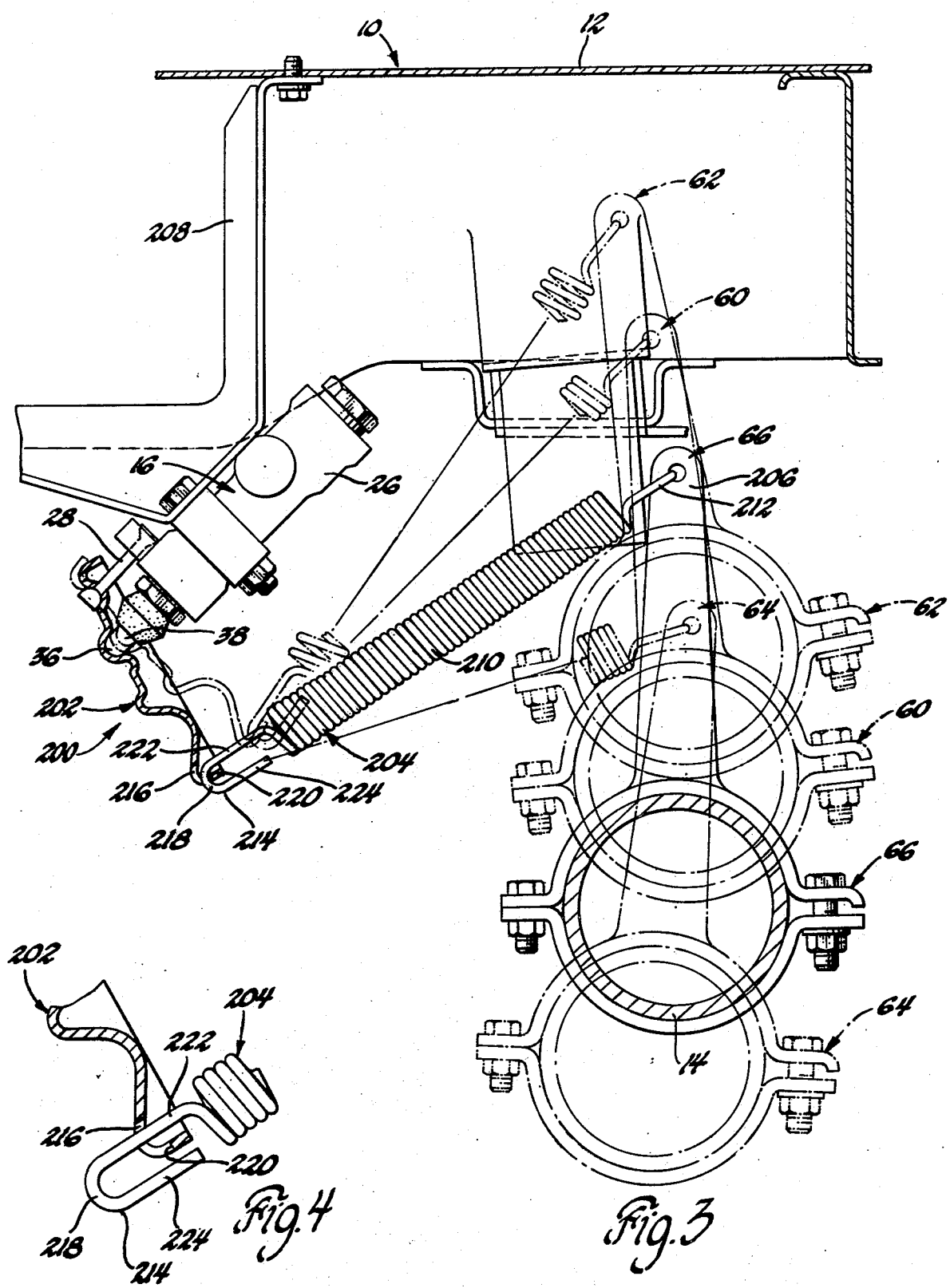

BRAKE ACTUATING PRESSURE PROPORTIONING SYSTEM AND PROPORTIONER MODIFYING ARM THEREFOR

The invention relates to a brake actuator proportioning system and more particularly to one which is modified by vehicle load while permitting excess jounce and rebound. The system includes a modifying arm of linkage pivotally attached to an axle housing, which is an unsprung portion of the vehicle. The linkage is also pivotally attached to a proportioner control arm pivotally mounted on a part of the vehicle body, which is a sprung portion of the vehicle. The proportioner for the brake system is mounted on the sprung vehicle body section and is connected in the brake actuating circuit. It includes spring load proportioner piston means with an arm arrangement including an arm pivotally attached to the vehicle body which will vary the spring load on the proportioner pivot means as the arm is pivotally moved. The modifying arm is a variable length linkage. In one form it includes a rod with first pivot means slidably received thereon adjacent one rod end which extends through an opening in the proportioner control arm, and second pivot means attached to the other rod end and suitably connected to the unsprung portion. A bracket on the housing is provided for this purpose. The rod has a first spring seat secured to it between the two pivot means, and a first tubular spring seat member slidably received on the rod and positioned between the first pivot means and the first spring seat. This seat member has one end forming a second spring seat and the other end forming a third spring seat. The third spring seat is in abutting relation with the first pivot means. A second tubular spring seat member is slidably received on the rod and has one end enclosing the second spring seat of the other seat member with that end being axially intermediate the second and third spring seats of the other seat member. The second tubular spring seat member is abuttingly engageable with the first and second spring seats. A caged first spring is mounted about the rod and has its ends engaging the third and fourth spring seats. This spring has a high spring rate and a high force pre-load. The first tubular spring seat member also passes through this spring. A second spring is received within the second tubular spring seat member about the rod and has its ends engaging the first and second spring seats. The second spring has a low spring rate and a low force pre-load. The various members and elements define an effective linkage length between the pivot means which remains constant as vehicle load changes between the light or curb vehicle weight position of the axle assembly and the full vehicle load position of the axle assembly. This is accomplished since the first spring seat under these conditions engages the second tubular member and the second spring seat engages the fourth spring seat due to pre-loads on the springs. When the vehicle unsprung axle has jounce movement beyond the full vehicle load position, the first spring compresses and shortens the effective linkage length between the pivot means. When the vehicle unsprung axle assembly moves beyond the light weight load position in rebound movement, the effective linkage length is increased between the pivot means, the second spring expanding and disengaging the first spring seat from the second tubular spring seat member. The second spring maintains a force between the proportioner control arm and the vehicle axle assembly to and including the maximum rebound position of the vehicle axle assembly thereby assisting in retaining the linkage in pivotal engagement with the proportioner control arm and the vehicle axle assembly.

In another form the modifying arm is provided as a closed loop spring connecting the proportioner control arm and a suitable attachment on the unsprung portion of the vehicle. In this arrangement the spring is arranged to maintain a constant length between the positions established by unsprung vehicle portion movements in the range between gross vehicle curb weight and gross vehicle full weight positions. When the unsprung portion moves in the jounce position beyond the gross vehicle full weight position, the spring extends to increase its effective length. This permits the proportioner to operate only in the range between vehicle curb weight and vehicle gross weight positions. Similarly when the unsprung portion of the vehicle curb weight position in the rebound direction, the spring is allowed to decrease its effective length. This is permitted by a sliding arrangement at the point of connection of one end of the spring with the proportioner control arm.

In The Drawings

FIG. 3 is similar to FIG. 1 and illustrates a modification embodying the invention.

FIG. 4 is a fragmentary view of a portion of FIG. 3 illustrating the relationship of certain parts during full rebound.

Figure 1:
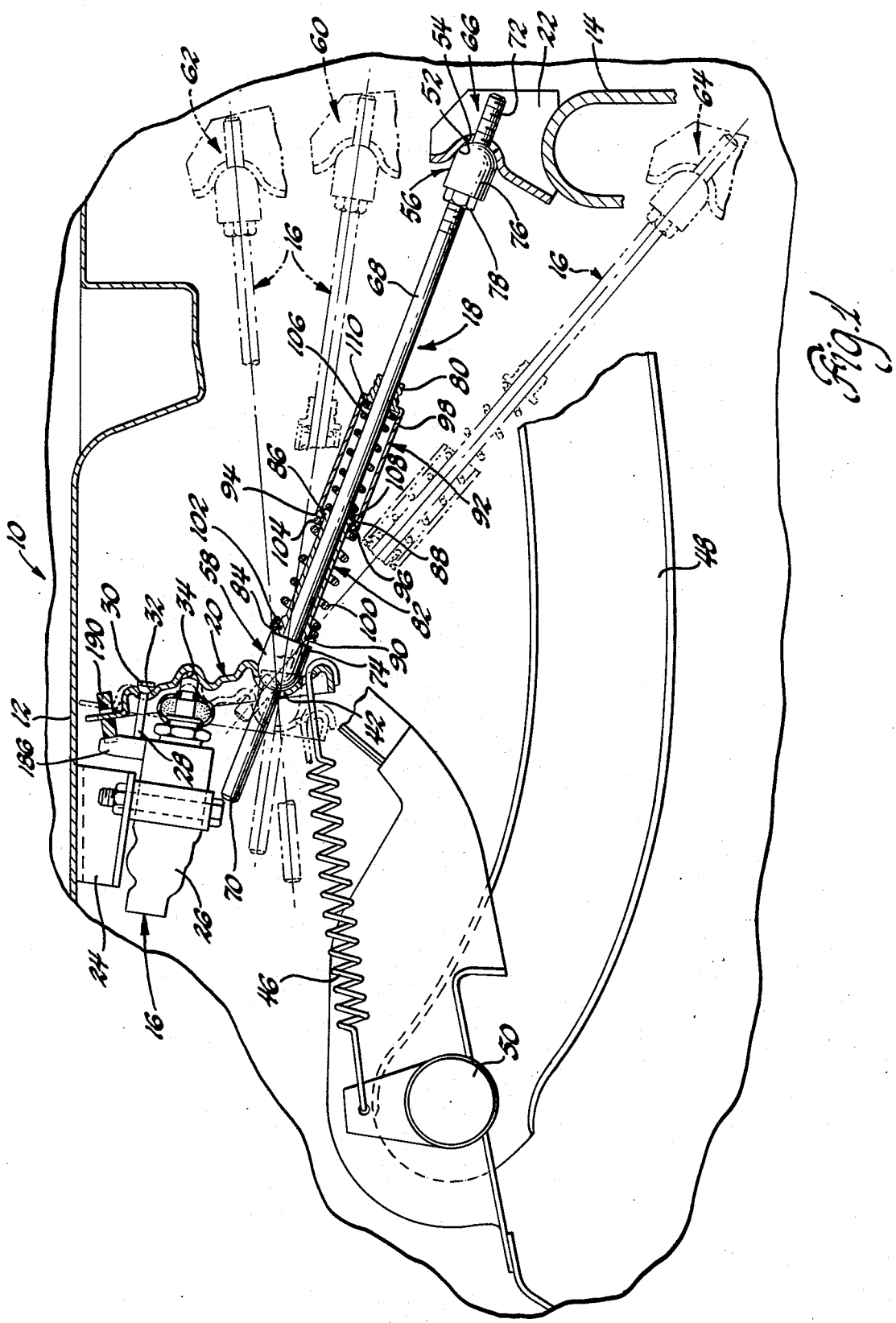
FIG. 1 illustrates a system embodying the invention, with parts broken away and in section, using solid and dot-dash lines to show various vehicle load responsive positions.

FIG. 1 shows a portion of a vehicle 10 which includes a body 12 defining a vehicle sprung portion, and an axle housing 14 defining a part of a vehicle unsprung portion. The system embodying the invention includes a proportioner 16, a variable length linkage 18, a control arm 20 pivotally attaching the proportioner 16 with one end of linkage 18, and a bracket 22 secured to the axle housing 14 and pivotally mounting the other end of linkage 18. The proportioner 16 is illustrated as being secured to body 12 by means of a bracket 24 so that the proportioner housing 26 effectively becomes a part of the sprung portion of the vehicle. The proportioner control arm 20 is pivotally mounted to the proportioner housing by means of a headed pin 28 which extends through an opening in arm 20 and has the pin head 30 fitting in a socket 32 formed in arm 20. Another socket 34 receives a head 36 of a plunger 38 of the proportioner 16. A third socket 40 in arm 20 has an opening extending through the bottom portion thereof, socket 40 being adjacent the other end of arm 20 from socket 32, with socket 34 intermediate sockets 32 and 40. The extreme end 44 of arm 20 has a tension spring 46 secured to it at one end, the other end of the spring being secured to a portion of the vehicle body. The spring 46 maintains sufficient tension on arm 20 to keep the arm sockets 32 and 34 respectively engaged with the heads 30 and 36 during all movements of arm 20.

The axle housing 14 is secured to a control arm 48, which is a part of the vehicle suspension system. The control arm is pivotally attached at 50 to the vehicle body 12. Suitable springs and shock absorbers, not shown, are also provided to control the axle housing. The bracket 22 is provided with a socket 52 having an opening 54 at the socket base which extends through the bracket. This socket is arranged to receive one end 56 of linkage 18, while the socket 40 is arranged to receive the other end 58 of that linkage. The axle housing 14 and bracket 22 are illustrated in solid lines in FIG. 1 in the position that they normally occupy in relation to body 12 when the vehicle is at curb or light load weight. The bracket and linkage 18 is illustrated in position 60 in dashed lines to show the position of the linkage 18 and bracket 22 when the vehicle 10 is at the gross vehicle weight, or under full load. Position 62 shows the maximum jounce position of the axle housing, the position being indicated by portions of linkage 18 and bracket 22 in dashed lines. The maximum rebound position 64 is similarly indicated. Jounce and rebound occurs as the vehicle suspension system yields and expands as the vehicle goes over bumps and depressions. The light load position 66 and the full load position 60 represent the normal extremes of relative movement of the axle housing 14 to the body 12 based on vehicle loading. It is only in movements between these two positions that it is desirable to modify the proportioning action of proportioner 16. Therefore linkage 18 is arranged to remain at a constant length so long as the unsprung portion of the vehicle is between positions 60 and 66, to shorten its length between positions 60 and 62, and to increase its length between positions 60 and 64.

Linkage 18 includes a rod 68 having one rod end 70 extending through opening 42 of socket 40 in control arm 20. The other rod end 72 is threaded and extends through opening 54 of socket 52 in bracket 22. A pivot member 74 forming a first pivot means is slidably mounted on rod 68 adjacent rod end 70 so that one end of the pivot member is pivotally received within socket 40. Due to the arrangement of opening 42, socket 40, and pivot member 74, rod 68 is permitted to move to the various positions illustrated as the unsprung portion of the vehicle moves between positions 62 and 64. Another pivot member 76 provides the second pivot means and has its head pivotally received in socket 52. Pivot member 76 is threaded on to rod end 72 and, after appropriate adjustment, is located into position by lock nut 78. The arrangement of opening 54, socket 52, rod end 72, and pivot member 76 is such that the rod can move pivotally relative to bracket 22 through the extremes illustrated by positions 62 and 64.

A spring seat 80 in the form of a flanged collar is secured to rod 68 in a position between pivot members 74 and 76 and forms the first spring seat. A tubular spring seat member 82 is received about a portion of rod 68 intermediate spring seat 80 and pivot member 74. One end 84 of seat member 82 abuts the end of pivot member 74, as shown in greater detail in FIG. 2. The other end 86 of seat member 82 is formed as a flange and defines a second spring seat 88. A snap ring is provided adjacent tubular seat member end 84 to define a third spring seat 90.

Another tubular spring seat member 92 is received about rod 68 between pivot member 74 and the first spring seat 80. One end 94 of member 92 is formed as an inwardly turned flange and defines a fourth spring seat 96. The inner side of end 94 is arranged to engage the end 86 of tubular member 82. Thus the second and fourth spring seats are abuttingly engageble, with tubular member 92 extending over spring seat 88. The end 98 of seat member 92 adjacent the first spring seat 80 may abut that spring seat as illustrated in FIG. 1.

A first compression spring 100 is positioned about rod 68 and the first tubular spring seat member 82 so that one spring end 102 engages the third spring seat 90 and the other spring end 104 engages the fourth spring seat 96. A second compression spring 106 is received about rod 68 within tubular spring seat member 92, with one spring end 108 engaging the second spring seat 88 and the other spring end 110 engaging the first spring seat 80. The spring 100 is caged and has a high force preload and a high spring rate sufficient to maintain its full caged length at any time that linkage 18 is located between positions 60 and 66. It is arranged to yield compressively when the unsprung portion of the vehicle passes beyond position 60 toward position 62 to allow the effective length of the linkage to be shortened.

Spring 106 has a low spring rate and a low force preload so that it retains the length shown during movements of linkage 18 between positions 60 and 66. This length is established by the abutting relationship of spring seat member 92 and the first spring seat 80. When the linkage 18 is moved beyond position 66 toward position 64 due to rebound movement of the unsprung portion of the vehicle, the effective length of the linkage is increased by permitting axial movement of rod 68 relative to control arm 20, spring 106 expanding and maintaining sufficient axial force between the pivot members 74 and 76 as the effective length of the linkage 18 increases, to maintain the rod ends 70 and 72 within their respective openings 42 and 54, and also retaining pivot members 74 and 76 within their respective sockets 40 and 52.

Figure 2:
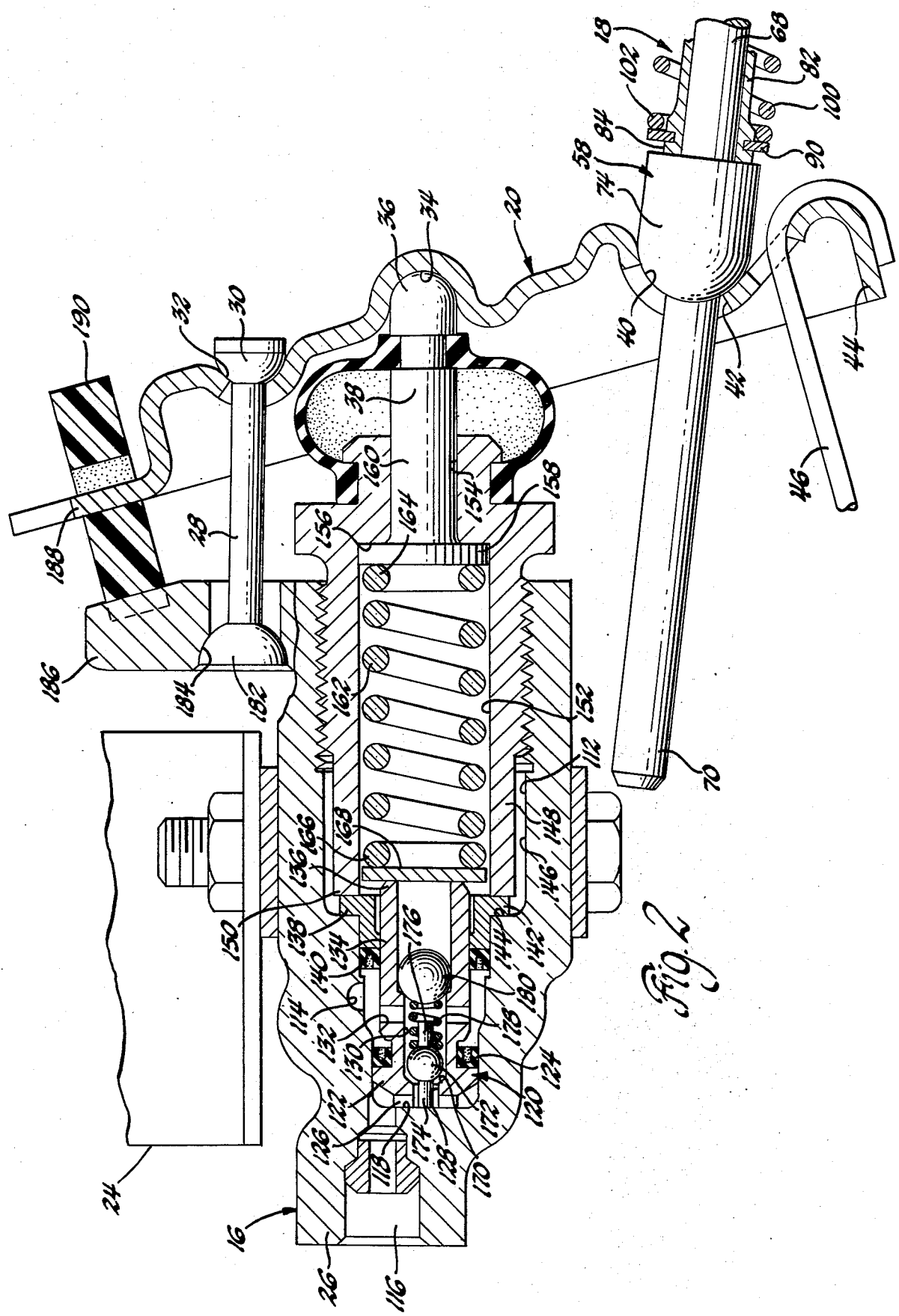
FIG. 2 is a cross section view of a portion of the system including the proportioner of FIG. 1.

The proportioner 16 has a bore 112 formed in proportioner housing 26, the bore being stepped to provide several bore sections. A port 114 intersects an intermediate part of the bore and provides a connection to receive brake fluid from a master cylinder. A port 116 leading to wheel brakes in a brake circuit intersects the bore end wall 118 and opens into the end of the bore adjacent that wall. A proportioning piston 120 is reciprocably received in bore 112 with a land 122 received in the bore portion adjacent end wall 118. A seal 124 is provided on land 122 to permit sliding and sealing movement of the piston relative to the bore wall. The end of piston 120 adjacent land 122 is castellated to provide radial passages 126. An axial passage 128 through the end of piston 120 on which land 122 is located is connected to passages 126. Piston 120 has a bore 130 extended axially therethrouh and terminating at passage 128. A cross passage 132 through an intermediate portion of the piston 120 intersects bore 130 from the opposite side of land 122 from passages 126. The piston body 134 extending from land 122 is smaller in diameter than the land and terminates at annular end 136. It is slidably received in a guide 138 and is sealed relative to the wall of bore 112 by seal 140. Guide 138 fits within a portion of bore 112 and has a flange 142 which abuts a shoulder 144 formed in bore 112. An enlarged portion 146 of bore 112 beyond shoulder 144 is threaded at its outer end and receives a threaded insert 148. The end 150 of insert 148 abuts guide flange 142 and holds the guide tightly in position in bore 112. The insert has a bore 152 opening through end 150, the bore having a smaller diameter section 154 at the other insert end, and provided with a shoulder 156. The plunger 38 has a flanged head 158 slidably received within bore 152 and capable of abutting shoulder 156. The plunger body 160 extends through bore section 154 and terminates in plunger head 36. A proportioner spring 162 is positioned within bore 152 so that one spring end 164 abuts the flanged head 158 and the other spring end 166 abuts a spring seat 168. Spring seat 168 is received within bore 152 and engages the proportioning piston end 136. Spring 162 is pre-loaded to provide a predetermined point at which proportioning action begins when the plunger flanged head 158 is in abutting engagement with shoulder 156. When plunger 38 is moved leftwardly as seen in FIG. 2, the pre-load on spring 162 increases, raising the pressure point at which proportioning action begins. Thus plunger 38 is a movable spring seat.

A shoulder joining proportioning piston bore 130 and passage 128 defines a valve seat 170. Valve 172 is received within bore 130, the valve being illustrated as a ball having oppositely extending valve pins 174 and 176. Valve pin 174 extends through passage 128 but is smaller in diameter than that passage to permit flow therethrough when the valve is open. A valve spring 178 is positioned about pin 176 and abuts the ball portion of valve 172. A plug 180 in piston 120 closes the right end of bore 130 and also provides a seat for spring 178. Spring 178 urges pin 174 into engagement with end wall 118.

During braking operation, brake actuating pressure from a master cylinder enters port 114 and the portion of bore 112 between seals 124 and 140. It passes through passage 132, bore 130, between valve 172 and valve seat 170, through passage 128 and passages 126, and out port 116 to the wheel brakes. When the brake actuating pressure builds up to a predetermined extent, the larger area of land 122 exposed to pressure passing through port 116 as compared to the area exposed to master cylinder pressure causes the proportioning piston 120 to move rightwardly as seen in FIG. 2. Valve spring 178 holds valve 172 in position since the end of valve pin 174 engages bore end wall 118, so that valve seat 170 moves rightwardly relative to valve 172. The valve and valve seat restrict flow, and proportioning action begins. The point at which this occurs is determined by the pre-load on spring 162. It can be seen that as arm 20 is moved clockwise about the head 30 of its piston pin 28, the pre-load on spring 162 increases, raising the point at which proportioning action begins. Thus as vehicle load is increased the proportioning point is increased.

Pin 28 may have another head 182 pivotally received in a socket 184 formed on an ear 186 on proportioner housing 26. This will assure appropriate movement of arm 20 as vehicle load change. The end 188 of arm 20 opposite arm end 44 is provided with a resilient bumper 190, which may be formed like a donut and inserted on arm end 188. The bumper engages ear 186 and is sufficiently resilient to cushion any movements of arm end 188 toward ear 186. Bumper 190 is also useful during preassembly and shipping since it maintains a slight force tending to rotate arm 20 clockwise about pin head 30, keeping the arm socket 34 engaged with plunger head 36.

FIG. 3, like FIG. 1, shows a portion of the vehicle 10 which includes the vehicle body 12 defining a vehicle sprung portion, and an axle housing 14 defining a part of the vehicle unsprung portion. The system embodying the modification of the invention shown in FIGS. 3 and 4 includes the proportioner 16, a variable length linkage 200 including a proportiner control arm 202 and a closed loop spring 204, and a bracket 206 secured to the axle housing 14. The proportioner 16 is illustrated as being secured to body 12 by means of a bracket 208 so that the proportioner housing 26 effectively becomes a part of the sprung portion of the vehicle. The proportioner control arm 202 is similar to proportioner control arm 20 of FIG. 1, but is arranged to be acted on in the opposite direction by the spring 204 as compared to the linkage 18 of FIG. 1. The proportioner control arm 202 is mounted with pin 28 as is control arm 20, and has a socket receiving the head 36 of proportioner plunger 38 in the same manner.

Spring 204 has a normally closed loop body section 210, a hooked end 212 fitting in an aperture of bracket 206 so as to retain that end of the spring, and a hooked end 214. End 214 extends through an opening 216 in the end of proportioner control arm 202 and is so arranged relative to the opening that it occupies a fixed lineal position so long as there is tension exerted through the length of the spring. Thus the bent portion 218 of the hooked end is normally engaged against the edge 220 of opening 216, as seen in FIG. 3. The sides 222 and 224 of hooked end 214 are joined by the bent portion 218 and are substantially parallel, with side 222 extending from the adjacent coil of the spring body section 210. Side 224 terminates in axially spaced relation from that adjacent coil to permit the spring to be installed.

The axle housing 14 and bracket 206 are illustrated in solid lines in FIG. 3 in position 66, which is the curb weight or light load position of the vehicle unsprung portion in relation to the vehicle sprung portion. Position 64 is the full rebound position of the axle housing and bracket 206, and is shown in dot-dash lines. Position 60 is the gross vehicle weight or full vehicle load position of the unsprung portion in relation to the sprung portion of the vehicle, also shown in dot-dash lines. Position 62 is the full jounce position of the vehicle unsprung portion in relation to the vehicle sprung portion, and is shown in dot-dash lines. For ease of identification these positions are indicated by the appropriate reference characters adjacent the axle housings and also at the positions of the upper end of bracket 206. The end of spring 204 connected to bracket 206, and a few of the coils adjacent thereto, are also illustrated by dot-dash lines for each of the positions 60, 62 and 64. The coils of the spring are illustrated as being closed for positions 60, 64 and 66, and opened under tension for position 62. The hooked end 214 and some adjacent coils of the spring are illustrated in dot-dash lines in FIG. 3 to show the position of that end of the spring 204 when the unsprung portion is in position 62. The proportioner control arm 202 is also illustrated in dot-dash lines in FIG. 3 to show its position for any movement of axle housing 14 and bracket 206 beyond position 60 toward and including position 62. The tension in the body portion 210 of spring 204 is such that the coils remain closed during movement toward the jounce position until position 60 is reached. At this point the proportioner plunger 38 is limited in its movement, thus limiting the movement of proportioner control arm 202 to the position shown in dot-dash lines. The coils of spring 204 are then allowed to open under additional tension exerted by movement of bracket 206 beyond position 60 toward position 62. This results in an increase in the effective length of spring 204 without moving proportioner control arm 202 or proportioner plunger 38. Thus the proportioner is not modified by movement of arm 202 beyond the gross vehicle weight or full load position 60.

If the vehicle is loaded in any position between light load and full load, arm 204 will maintain a fixed length with the coils of body section 210 being closed. Movements of the vehicle unsprung portin in this range will not affect the effective length of spring 204. As the vehicle is unloaded from a full load position, for example, the axle housing 14 and bracket 206 will move from position 60 toward position 66. This permits pivotal movement of proportioner control arm 202 under influence of the proportioner spring 162 in clockwise direction as seen in FIG. 3 from the position shown in solid lines so that the effective length of spring 204 is unchanged. This also occurs as the vehicle unsprung portion moves between the range of positions 60 and 66 during operation of the vehicle and the usual vehicle suspension movements. During such operations, the vehicle unsprung portion is also movable toward the full rebound position 64 from the light load position 66. Since the proportioner control arm 202 is not to be moved further in a clockwise direction, and since spring 204 cannot readily collapse lengthwise, an arrangement is provided as shown in FIG. 4 to permit the decrease of the effective length of spring 204 while maintaining the spring's connections to arm 202 and bracket 206. As bracket 206 moves downwardly from position 66, the distance between the bracket end and the end of arm 202 decreases, moving spring 204 linearly relative to arm 202. Opening 216 is such that the hooked end 214 can slide relative to arm 202, without becoming detached. This sliding action can be readily discerned by comparing the relative positions of spring hooked end 214 and proportioner control arm 202 in FIGS. 3 and 4. Upon movement of the vehicle unsprung portion to and beyond position 66, the hooked end 214 of spring 206 slides back to the position shown in FIG. 3 and retains that position relative to arm 202 so long as the vehicle unsprung portion does not return below position 66.

It can therefore be seen that the mechanism embodying the invention permits proportioning of a brake actuating circuit in accordance with variations of vehicle loading between light load and full load, while permitting the vehicle unsprung portion to move under control of its suspension system from full jounce to full rebound positions without affecting the proportioning action in such positions which are beyond the normal load positions. The linkage can be utilized with a variable rate suspension. It maintains a constant effective length so long as the unsprung portion of the vehicle is positioned within its load-determined position limits, and varies its effective length when the unsprung portion is outside these limits.

What is claimed is:

1. A device for controlling a brake actuating pressure proportioner comprising:
    a proportioner modifying arm adapted to be pivotally attached to a sprung portion of a vehicle;
    a variable length linkage having one end pivotally engaging said arm to exert proportiner modifying force thereon and the other end adapted to pivotally engage an unsprung portion of the vehicle; said linkage including:
        a rod having first pivot means slidably received thereon adjacent one rod end which extends through an opening in said arm, and second pivot means attached to the other rod end and defining said linkage other end,
        a first spring seat secured to said rod intermediate the rod first and second pivot means,
        a first tubular spring seat member slidably received about said rod intermediate said rod first pivot means and said first spring seat and having one end forming a second spring seat and the other end forming a third spring seat and in abutting relation with said first pivot means,
        a second tubular spring seat member slidably received about said rod and enclosing said second spring seat and having one end forming a fourth spring seat axially intermediate said second and third spring seats, and abuttingly engageable with said first and second spring seats,
        a caged first spring having its ends engaging said third and fourth spring seats and having a high spring rate and a high force pre-load,
        and a second spring having its ends engaging said first and second spring seats and having a low spring rate and a low force pre-load;
    said first spring seat engaging said second tubular member and said second spring seat engaging said fourth spring seat at light vehicle load to define an effective linkage length between said pivot means which remains constant as vehicle load increases from light vehicle load to full vehicle load;
    said first spring compressing and shortening the effective linkage length between said pivot means upon jounce movement of the vehicle unsprung portion beyond its full vehicle load position;
    said second spring expanding and disengaging said first spring seat from said second tubular spring seat member and increasing the effective linkage length between said pivot means upon rebound movement of the vehicle unsprung portion beyond its light vehicle load position, said second spring maintaining a force between said arm and the vehicle unsprung portion when the vehicle unsprung portion is between its light vehicle load position and its maximum rebound position to retain said linkage in pivotal engagement with said arm and the vehicle unsprung portion.

2. For use in a vehicle having a sprung body section and an unsprung axle and a brake actuating circuit for controlling actuation of brake means on the axle, a brake actuating pressure proportioning system comprising:
    a first arm adapted to be fixedly secured to the housing of the axle and moved therewith relative to the sprung body section as vehicle load is changed;
    brake actuating pressure proportioning means adapted to be fixedly mounted on the vehicle sprung body section and connected in the brake actuating circuit, said proportioning means including housing means having therein spring loaded proportioner piston means and means associated with said piston means to vary the spring load thereon;
    a second arm pivotally secured to said hosing means at a first pivot point on said second arm, said second arm engaging said spring load varying means at a second pivot point on said second arm, said second arm having a third pivot point at one end thereof with said second pivot point being linearly intermediate said first and third pivot points;
    and spring means having one end pivotally secured to said second arm at said third pivot point and its other end pivotally secured to said first arm and arranged to increase the force applied to said second arm as vehicle load increases and thereby increase the spring load on said proportioner piston means to increase the brake actuating pressure level at which said proportioning means commences to proportion brake actuating pressure in the brake actuating circuit;
the other end of said second arm being adjacent to but linearly spaced from said first pivot point and on the linearly opposite side of said first pivot point relative to said second pivot point, said second arm other end having resiliently deformable shock absorbing means thereon engaging said housing at least during the first portion of the load range of movement of said second arm as vehicle load increases.

3. In a vehicle having a load sensing proportioner, a vehicle sprung portion on which said proportioner is mounted, a vehicle unsprung portion including a support member having a range of movements relative to the vehicle sprung portion, the limits of said range of movements being defined by full jounce and full rebound limits of said vehicle unsprung portion, said range of movements including intermediate support member positions corresponding to vehicle curb weight as a light load and gross vehicle weight as a full load; the improvement comprising a linkage including:
 a proportioner control arm movably mounted on said proportioner and having a range of movements the limits of which are defined by proportioner control requirements for vehicle curb weight and gross vehicle weight;
 and link means connecting said proportioner control arm to said support member, said link means having a fixed effective length between said proportioner control arm and said support member during excursions of said support member within the portion of its range of movements defined by its aforesaid intermediate positions as limits and transmitting such support member movements to said proportioner control arm to move that arm within its aforesaid range of movements correspondingly, said link means changing its effective length to accommodate movements of said support member in its range of movements toward either of said full jounce and full rebound limits of movement beyond the support member range of movements defined by the aforesaid intermediate positions without moving said proportioner control arm, the effective length of said link means being the length from the connections of said link means to said proportioner control arm and said support member.

4. In a vehicle having a load sensing proportioner, a vehicle sprung portion on which said proportioner is mounted, a vehicle unsprung portion including a support member having a range of movements relative to the vehicle sprung portion, the limits of said range of movements being defined by full jounce and full rebound limits of said vehicle unsprung portion, said range of movements including intermediate support member positions corresponding to vehicle curb weight as a light load and gross vehicle weight as a full load; the improvement comprising a linkage including:
 a proportioner control arm movably mounted on said proportiner and having a range of movements the limits of which are defined by proportioner control requirements for vehicle curb weight and gross vehicle weight;
 and link means defined by an extension spring connecting said proportioner control arm to said support member, said extension spring having coils closed axially to provide a fixed effective length between said proportioner control arm and said support member during excursions of said support member within the portion of its range of movements defined by its aforesaid intermediate positions as limits and transmitting such support member movements to said proportioner control arm to move that arm within its aforesaid range of movements correspondingly, said extension spring increasing its effective length by axial coil expansion to accommodate movements of said support member in its range of movements toward one of said full jounce and full rebound limits of movement beyond the support member range of movements defined by the aforesaid intermediate positions without moving said proportioner control arm, said extension spring having a slidable connection with said proportioner control arm and thereby decreasing its effective length to accommodate movements of said support member in its range of movements toward the other of said full jounce and full rebound limits of movement beyond the support member range of movements defined by the aforesaid intermediate positions without moving said proportioner control arm, the effective length of said extension spring being the length from the connections of said extension spring to said proportioner control arm and said support member.

5. In a vehicle having a load sensing proportioner, a vehicle sprung portion on which said proportioner is mounted, a vehicle unsprung portion including a support member having a range of movements relative to the vehicle sprung portion, the limits of said range of movements being defined by full jounce and full rebound limits of said vehicle unsprung portion, said range of movements including intermediate support member positions corresponding to vehicle curb weight as a light load and gross vehicle weight as a full load; the improvement comprising a linkage including:
 a proportioner control arm movably mounted on said proportioner and having a range of movements the limits of which are defined by proportioner control requirements for vehicle curb weight and gross vehicle weight;
 and link means defined by a spring-loaded control rod assembly having pivot means connecting said proportioner control arm to said support member, said link means having a fixed effective length between said proportioner control arm and said support member during excursions of said support member within the portion of its range of movements defined by its aforesaid intermediate positions as limits and transmitting such support member movements to said proportioner control arm to move that arm within its aforesaid range of movements correspondingly, said link means changing its effective length to accommodate movements of said support member in its range of movements toward either of said full jounce and full rebound limits of movement beyond the support member range of movements defined by the aforesaid intermediate positions without moving said proportioner control arm, the effective length of said link means being the length from the connections of said link means to said proportioner control arm and said support member.

* * * * *

UNITED STATES PATENT AND TRADEMARK OFFICE
CERTIFICATE OF CORRECTION

PATENT NO. : 4,060,283
DATED : November 29, 1977
INVENTOR(S) : Michael Demido, Ronald L. Shellhause It is certified that error appears in the above-identified patent and that said Letters Patent are hereby corrected as shown below:

Column 2, line 19, after "vehicle" insert moves below the vehicle line 53, after "opening" insert 42.

Column 3, line 65, "engageble" should read engageable

Column 4, line 48, "therethrouh" should read therethrough

Column 5, line 50, "change" should read changes line 66, "proportiner" should read proportioner Column 7, line 4, "portin" should read portion line 10, before "clockwise" insert a line 58, claim 1, "proportiner" should read proportioner

UNITED STATES PATENT AND TRADEMARK OFFICE
CERTIFICATE OF CORRECTION

PATENT NO. : 4,060,283
DATED : November 29, 1977
INVENTOR(S) : Michael Demido, Ronald L. Shellhause It is certified that error appears in the above–identified patent and that said Letters Patent are hereby corrected as shown below:

Column 8, line 57, claim 2, "hosing" should read housing.

Signed and Sealed this

Ninth Day of May 1978

[SEAL]

Attest:

RUTH C. MASON
Attesting Officer

LUTRELLE F. PARKER
Acting Commissioner of Patents and Trademarks